United States Patent
Volos et al.

(10) Patent No.: US 11,233,717 B2
(45) Date of Patent: Jan. 25, 2022

(54) SYSTEM AND METHOD FOR COLLABORATIVE CENTRALIZED LATENCY CHARACTERIZATION

(71) Applicants: DENSO International America, Inc., Southfield, MI (US); DENSO CORPORATION, Aichi-pref. (JP)

(72) Inventors: Haris Volos, Sunnyvale, CA (US); Takashi Bando, Mountain View, CA (US)

(73) Assignees: DENSO INTERNATIONAL AMERICA, INC., Southfield, MI (US); DENSO CORPORATION, Aichi (JP)

( * ) Notice: Subject to any disclaimer, the term of this patent is extended or adjusted under 35 U.S.C. 154(b) by 139 days.

(21) Appl. No.: 16/511,702

(22) Filed: Jul. 15, 2019

(65) Prior Publication Data
US 2021/0021500 A1   Jan. 21, 2021

(51) Int. Cl.
*H04L 12/26*   (2006.01)
*H04W 4/40*   (2018.01)
*H04W 24/10*   (2009.01)

(52) U.S. Cl.
CPC .......... *H04L 43/0852* (2013.01); *H04W 4/40* (2018.02); *H04W 24/10* (2013.01)

(58) Field of Classification Search
None
See application file for complete search history.

(56) References Cited

U.S. PATENT DOCUMENTS

| | | | |
|---|---|---|---|
| 8,566,441 B2 | 10/2013 | Agarwal et al. | |
| 8,930,979 B2 | 1/2015 | Tidwell et al. | |
| 2012/0131129 A1* | 5/2012 | Agarwal | H04L 43/0852 709/216 |
| 2017/0160742 A1* | 6/2017 | Ross | G05D 1/0274 |
| 2020/0249039 A1* | 8/2020 | Lassoued | G01C 21/34 |

* cited by examiner

*Primary Examiner* — Ajit Patel
*Assistant Examiner* — Pamit Kaur
(74) *Attorney, Agent, or Firm* — Burris Law, PLLC

(57) ABSTRACT

A central latency system includes a communication device configured to exchange data with an external device. The data includes current latency data, current contextual data associated with the latency data, or a combination thereof. The system further includes a controller configured to aggregate latency data in response to acquiring the current latency data, generate a latency characterization information based on the aggregated latency data, and transmit the latency characterization information to the external device.

19 Claims, 9 Drawing Sheets

SYSTEM AND METHOD FOR COLLABORATIVE CENTRALIZED LATENCY CHARACTERIZATION

FIELD

The present disclosure relates to a system and method for determining latency information for in-vehicle drive assist applications.

BACKGROUND

The statements in this section merely provide background information related to the present disclosure and may not constitute prior art.

Technological advancement has been made in the area of V2X (vehicle-to-everything communication) in which vehicles, roadside devices, cloud-based network, and cellular phones, among other components, form distributed computing systems for sharing and processing data. As an example, a vehicle may transmit a signal that includes data providing the location, speed, and/or travel direction of the vehicle, and a roadside device may transmit a signal that includes data related to environmental conditions or other information.

At times, there are delays (i.e., latencies) associated with the propagation of the signals and the processing of data associated with the signals. Depending on the durations of these delays, some of the data transferred may be outdated and, as a result, unusable. As an example, some vehicles may include drive assist software applications, such as lane change assist or collision avoidance. These applications may use data from other vehicles and/or roadside devices to determine whether a specific application should be performed and, thus, utilize time sensitive information.

SUMMARY

This section provides a general summary of the disclosure and is not a comprehensive disclosure of its full scope or all of its features.

In one form, the present disclosure is directed toward a central latency system that includes a communication device and a controller. The communication device is configured to exchange data with an external device, where the data includes current latency data, current contextual data associated with the latency data, or a combination thereof. The controller is configured to aggregate latency data in response to acquiring the current latency data, generate a latency characterization information based on the aggregated latency data, and transmit the latency characterization information to the external device via the communication device.

In another form, the present disclosure is directed toward a central latency system that includes a communication device configured to exchange data with an external device, where the data includes latency data, contextual data associated with the latency data, or a combination thereof, and a controller configured to define a latency map based on a communication zone in response to acquiring the latency data. The latency map defines a plurality of cells within the predefined communication zone based on the latency data associated with a respective cell, geometric segmentation, or a combination thereof. The controller is further configured to aggregate the latency data associated with each of the cells, generate a latency characterization information for each of the cells based on the aggregated latency data for the respective cell, and transmit the latency characterization information for a given cell from among the plurality of cells to the external device provided in the given cell via the communication device.

In yet another form, the present disclosure is directed toward a method that includes acquiring data that includes current latency data, current contextual data associated with the latency data, or a combination thereof; aggregating latency data in response to acquiring the current latency data; generating a latency characterization information based on the aggregated latency data; and transmitting the latency characterization information to an external device.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
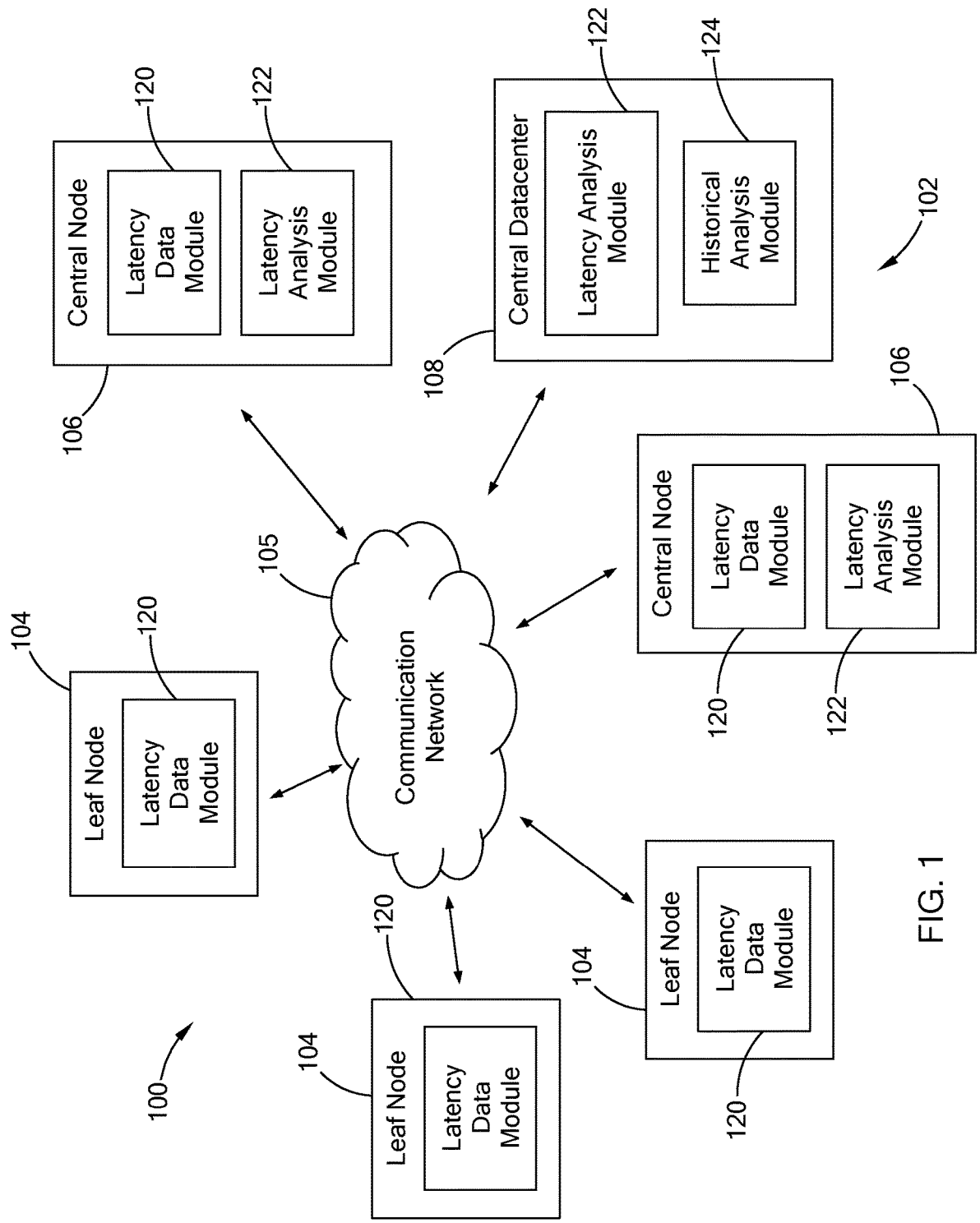
FIG. 1 is a functional block diagram of a system having a central latency system in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Latencies associated with signals exchanged in a system including vehicles, roadside devices, cloud-based networks, and/or cellular phones, among other nodes, is typically analyzed to provide the accuracy or confidence of the data associated with signal. As an example, each node of a system may collect latency data and calculate latency parameters for connecting to other nodes.

The present disclosure is directed toward a central latency system that is configured to acquire latency data from the different nodes and aggregate the latency data and generate latency characterization information (e.g., latency models for current and/or projected latencies). The latency characterization information may then be shared with the nodes, such as vehicles, roadside devices, cloud-based network, and cellular phones, among others. The central latency system may reduce latency estimation traffic for each node and allow nodes to receive the latency characterization information in real-time or even in advance based on a travel route of the vehicle. These and other features are described in detail below.

FIG. 1 illustrates an example collaborative system 100 configured to analyze latency samples at a central latency system 102 and distribute latency information to devices within the system 100. The devices are referred to as leaf nodes 104, and may include vehicles, cellular phones (e.g., smart phones), and/or tablets, among other devices that have computing and network communication capabilities. While three leaf nodes 104 are illustrated, the system 100 may include one or more leaf nodes 104.

In one form, the system 100 is provided as a distributed edge computing system having a communication network 105 for communicably coupling the leaf nodes 104 and the central latency system 102. The communication network 105 is provided as a distributed network and may include Internet, switches, routers, base stations, gateways, and/or satellites, among others. Nodes within the system 100 may transmit signals to each other to share information such as basic safety messages, environmental conditions (e.g., precipitation), traffic delays, and/or services within the communication area of the network 105, among other information.

The central latency system 102 includes one or more central nodes 106 and a central datacenter 108. In one form, the central nodes 106, which may also be referred to as access points, are provided as roadside devices located at a traffic light signal, a building, a pole near a road, or some other structure. A central node 106 may also be provided at the central datacenter 108. The central nodes 106 may be configured to monitor an environment in a local area of the central node 106, analyze latencies of signals transmitted to and/or from the central node, and/or share information to other nodes regarding the environment, latency, or other related information. In one form, the central datacenter 108 is part of a cloud-based network and includes routers, servers, and/or databases, among other devices. As described herein the central latency system 102 is configured to analyze latency data and transmit latency models and other data to leaf nodes 104 within the system. It should be readily understood that while two central nodes 106 are illustrated, the system 100 may include one or more central nodes. In addition, the system 100 may include roadside devices that are not part of the central latency system 102 but do provide information to other nodes within the system 100. Such roadside devices are considered leaf nodes 104.

In one form, each leaf node 104 and central node 106 includes a latency data module 120 that is configured to determine transmission delays associated with transmitting data between nodes, which is dependent on predetermined data transfer rates and the amount of data being transferred. In one form, the latency data module 120 is configured to obtain latency estimates using ping or timestamp based methods, and calculate latencies (i.e., time delays) based on the data rates of one or more communication links involved and the amounts of data being transferred on each link. In the following, latency data includes latency estimates.

The central latency system 102 is configured to acquire the latency data from the nodes 104 and 106, and aggregate and characterize latency data. In one form, the central nodes 106 and the central datacenter 108 include a latency analysis module 122 that is configured to analyze the latency data to determine latency models, projections, and/or trends, among other outputs. In one form, the central nodes 106 may not include the latency analysis module 122 and are configured to calculate its latency estimates and/or operate as a network connection by transferring latency data from other nodes to the datacenter 108. The central datacenter 108 may then characterize the latency data received and transmit information to the other nodes. The central datacenter 108 also includes a historical analysis module 124 that is configured to store historical latency estimates and characterize historical latency estimates to provide latency models, distribution, and/or projections, among other data to the nodes 104 and 106. While not illustrated, the central datacenter 108 may also include a latency data module 120 that is configured to determine transmission delays associated with transmitting data between nodes and the central datacenter 108.

Figure 2:
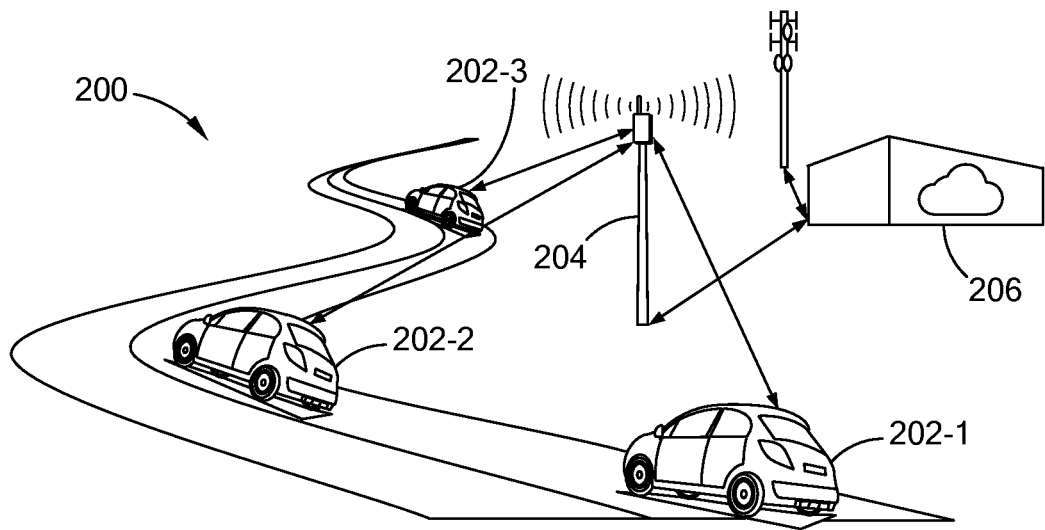
FIG. 2 illustrates an example system having vehicles in communication with a central latency system in accordance with the teachings of the present disclosure.

FIG. 2 illustrates an example of a collaborative system 200 having multiple vehicles 202-1, 202-2, 202-3 (collectively "vehicles 202".), roadside devices 204, and a central datacenter 206. The collaborative system 200 may be configured in a similar manner as system 100. Here, the vehicles 202 are leaf nodes, and the roadside devices 204 and central datacenter 206 form a central latency system of the present disclosure. In one form, the roadside device 204 is a central node that receives latency estimates from the vehicles 202 and transmits latency characterization information to the vehicles 202.

Figure 3:
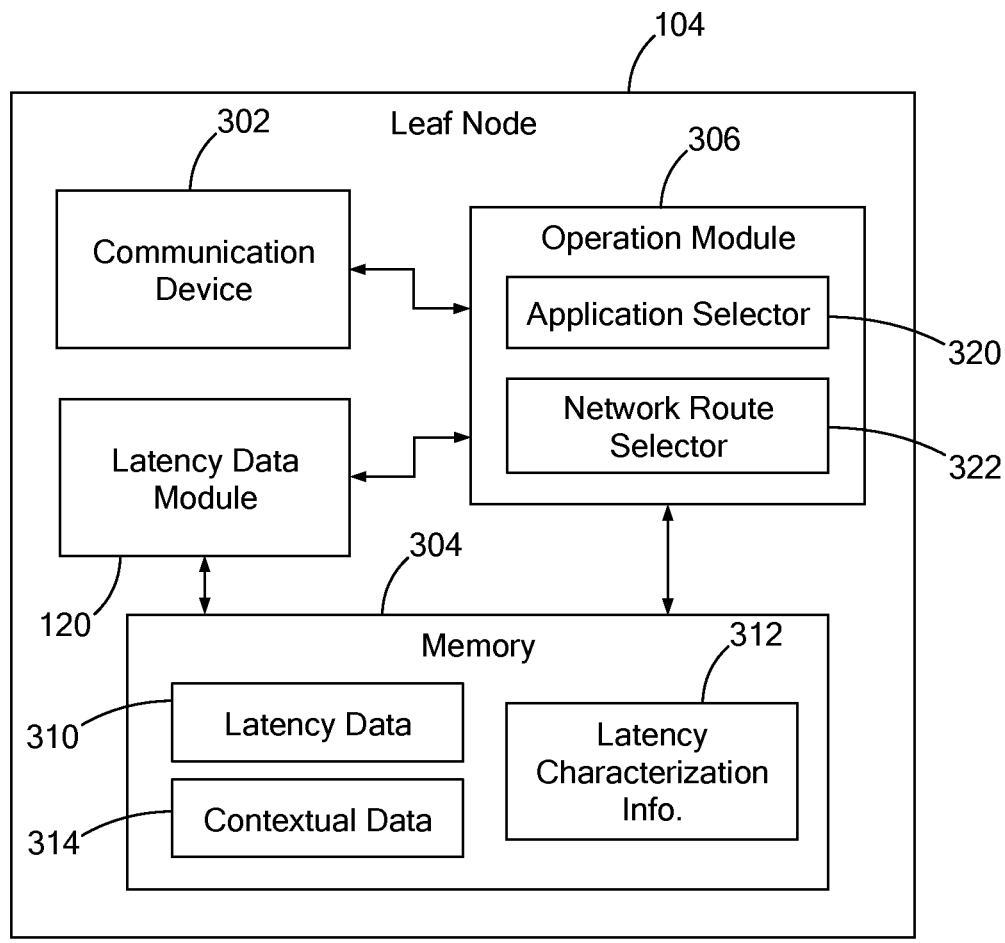
FIG. 3 is a functional block diagram of a leaf node of the system of FIG. 1.

Referring to FIG. 3, the leaf node 104 is configured to include a communication device 302, the latency data module 120, a memory 304, and an operation module 306. In one form, the leaf node 104 includes a controller having one or more microprocessors, memory (e.g., RAM, ROM, etc.) that stores computer readable instructions (i.e., software programs) executed by the microprocessors, and other suitable components. The controller is configured to perform the operations provided herein with respect to the leaf node 104.

The communication device 302 is configured to exchange signals with other nodes of the system 100 via the network 105, and may include communication hardware such as transceivers, routers, and/or on-board units, among other components. The communication device 302 is further configured to transmit a signal indicative of a latency characterization request to the central latency system 102. Such a request may include identification information, location, current latency data, and/or travel route, among other information. In one form, the leaf node 104 may be provided as part of a larger system, such as a vehicle, and may use a communication device of the system in lieu of having its own communication device.

As described above, the latency data module 120 is configured to determine delays associated with the transmission/reception of signals and calculates the latency estimate. In one form, the latency data module 120 is configured to generate the latency characterization request which includes the latency estimates and acquires latency characterization information such as latency model(s), from the central latency system 102. In addition to or in lieu of latency characterization information, the latency data module 120 may acquire historical latency characterization information that includes historical latency models and/or projections from the central latency system 102.

The memory 304 stores latency data 310 calculated by the latency data module 120, latency characterization information 312 from the central latency system 102, and/or contextual data 314 associated with the latency data 310. The contextual data may include the number of vehicles connected to and utilizing network services within a given geographical area, an identification of the geographical area, a date, a day of the week, a time of day, holiday information if available, current weather conditions, and/or vehicle traffic data, among other data.

The operation module 306 is configured to operate one or more components within the leaf node based on the latency characterization information 312. In one form, the operation module 306 includes an application selector 320 and a network route selector 322. The application selector 320 enables execution of software applications provided within the device based on a confidence level, projection data, and/or other latency characterization information. The network route selector 322 selects a route for transmitting and receiving signals associated with a software application based on the confidence level, projection data, and/or other latency characterization information. For example, the device may be a vehicle having different software applications for driving the vehicle such as lane assist and collision detection, among others. The application selector 320 is configured to determine which application to execute and the network route selector analyzes different signal transmission routes to select a desired route for transmitting a signal for a selected software application to be executed. Examples of an application selector and a network route selector is provided in co-pending application U.S. Ser. No. 15/882,420 titled VEHICLE APPLICATION ENABLING AND NETWORK ROUTING SYSTEMS IMPLEMENTED BASED ON LATENCY CHARACTERIZATION AND PROJECTION, which is commonly owned and the disclosure of which is incorporated by reference. As provided, the application selector 320 is configured to determine whether the latency estimates and/or projected latency estimates are less than an application maximum permitted latency for a given software application. If so, the application selector enables the execution of the given software. The network route selector is configured to (i) select one of the network routes based on the characterization of projected latency estimates, and (ii) transmit the signals along the selected one of the routes.

The operation module 306 may be configured to perform different and/or additional operations, such as a travel route selector, and should not be limited to the application selector and/or the network route selector. In addition, while the operation module 306 is described with respect to a vehicle, the operation module is configurable for other devices such as cellular devices and tablets, among others.

Figure 4:
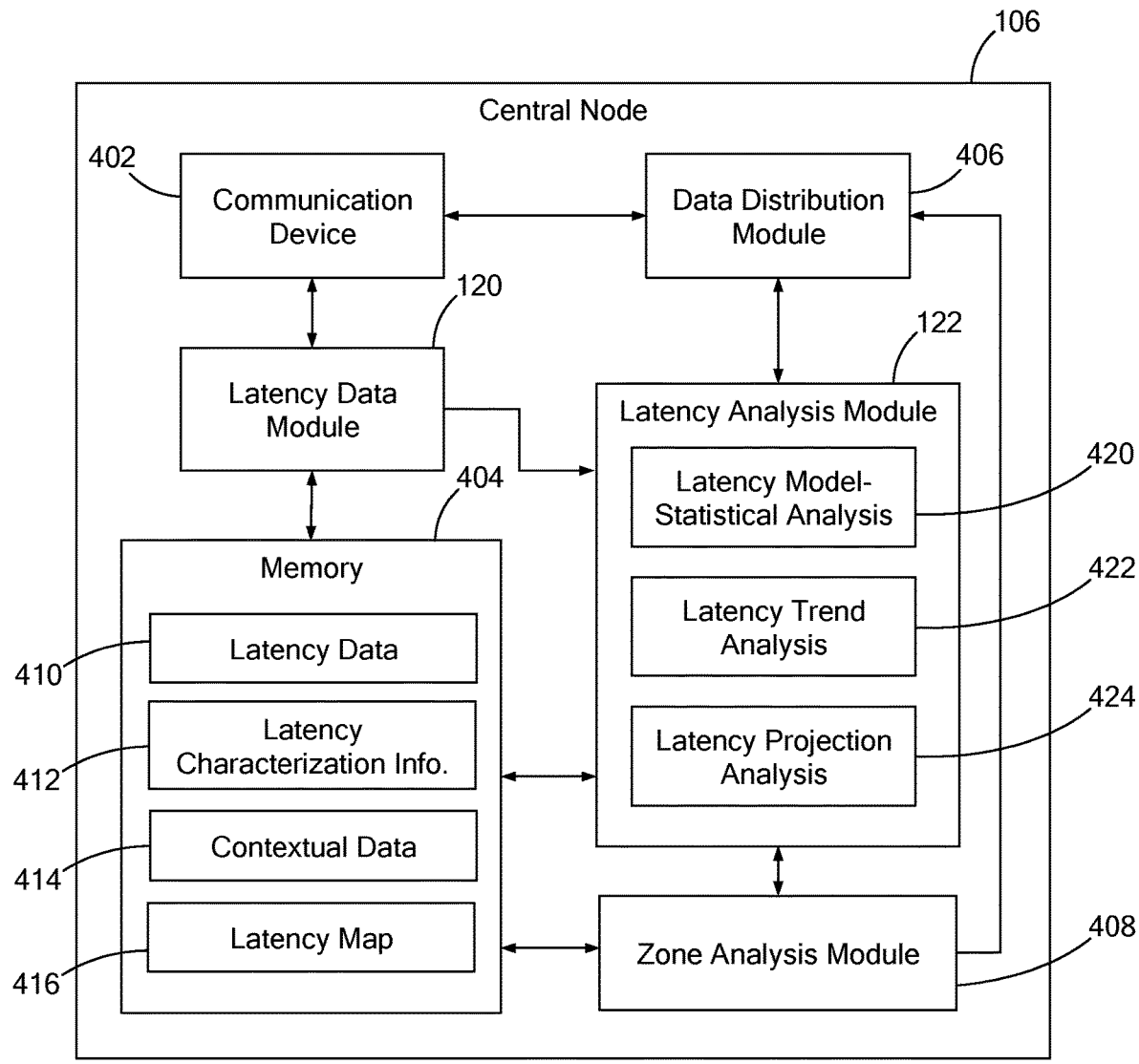
FIG. 4 is a functional block diagram of a central node of the central latency system of FIG. 1.

Referring to FIG. 4, the central node 106 is configured to determine its latency estimates, acquire latency estimates from other nodes 104 and 106, and analyze the data to obtain latency characterization information. The latency characterization information is then distributed to the leaf nodes 104, other central nodes 106, and/or the central datacenter 108. In one form, the central node includes a communication device 402, the latency data module 120, memory 404, a data distribution module 406, the latency analysis module 122, and a zone analysis module 408. In one form, the central node 106 includes a controller having one or more microprocessors, memory (e.g., RAM, ROM, etc.) that stores computer readable instructions (i.e., software programs) executed by the microprocessor, and other suitable components. The controller is configured to perform the operations provided herein with respect to the central node 106.

The communication device 402 is configured to exchange signals with other nodes of the system 100 and the central datacenter via the network 105, and may include communication hardware such as transceivers, routers, and/or other components. As described above, the latency data module 120 is configured to determine delays associated with the transmission/reception of signals to/from the central node 106. The memory 404 stores latency data 410 calculated by the latency data module 120, latency characterization information 412 calculated by the latency analysis module 122, contextual data 414 associated with the latency data 410, and a latency map 416 that defines latency for multiple cells within a communication zone of the central node 106, as described herein. The data distribution module 406 is configured to process latency characterization requests from leaf nodes 104 and provide the requested information to the identified leaf node 104.

The latency analysis module 122 is configured to analyze the latency estimates to obtain latency characterization information. The latency characterization information includes, but is not limited to, current latency status, current latency model, projection model, latency trends, latency confidence levels, latency projection data, and projected latency estimates, among other characterizations. The latency analysis module 122 may distribute the latency characterization information to the leaf nodes 104 requesting the information and/or to the central datacenter 108.

In one form, the latency analysis module 122 is configured to perform a latency model-statistical analysis 420, a latency trend analysis 422, and a latency projection analysis 424. Examples of these analyses are further provided in the above-referenced co-pending application U.S. Ser. No. 15/882,420. In one form, the latency model-statistical analysis 420 is configured to characterize recent/current latency data (e.g., the last predetermined number N of latency estimates, such as 1, 5, 10, among other values) by performing probabilistic modeling such as estimating parameters of a normal distribution and/or defining a probability distribution function curve. In one form, the number of latency estimates used for the characterization is a function of the desired statistical confidence or other accuracy metric(s) of the algorithm used and a desired time interval defined for the software application. The latency model-statistical analysis 420 may further determine a cumulative distribution function curve based on the probability distribution function curve, and further determine a latency confidence level based on the cumulative distribution function curve. Other model estimation methods may be performed including a Gaussian distribution method, a Half-normal distribution method, a method including a mixture of Gaussian functions, a Gamma distribution method, or other modeling method.

The latency trend analysis 422 is configured to determine a trend based on the latency data. In one form, the latency trend analysis 422 develops a trend based on previous latency data (i.e., a last predetermined number M of latency estimates, which is determined in a similar manner as "N"). The latency trend analysis 422 may include using regression methods (linear and non-linear methods), auto-regression methods, auto-regressive-moving-average models, auto-regressive integrated moving average methods, Kalman filter prediction methods, trend following methods, neural networks, deep learning methods, and/or other trend analysis and/or machine learning techniques. Accordingly, the latency trend analysis 422 may generate an estimated and projected trend line (or curve). The trend line may also be determined based on averages of the latency estimates for predetermined points in time or predetermined periods of time.

The latency projection analysis 424 is configured to determine projected latency estimates based on the trend line and/or previous latency estimates. In one form, the latency projection analysis 424 characterizes the projected latency estimates which may include generating a probability distribution function curve and a cumulative distribution function curve that is based on the projected latency estimates instead of the obtained latency estimates. The latency projection analysis 424 may calculate a projected latency confidence level based on the projected cumulative distribution function curve.

Figure 5A:
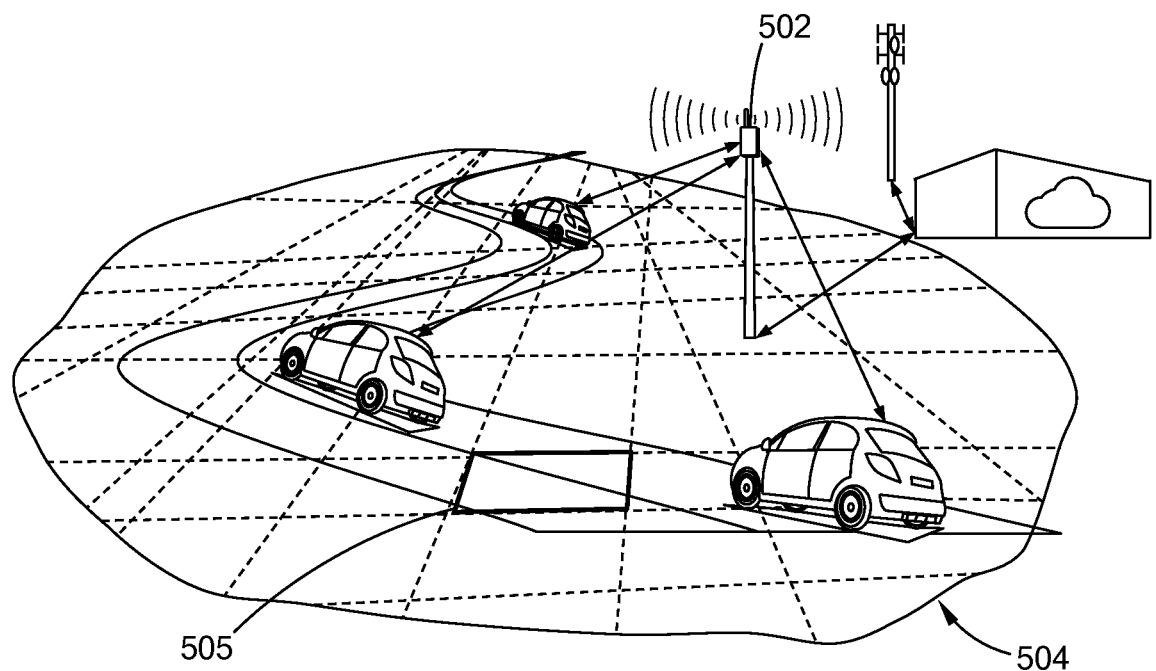
FIGS. 5A and 5B illustrate latency maps for a communication zone in accordance with the teachings of the present disclosure.
Figure 5B:
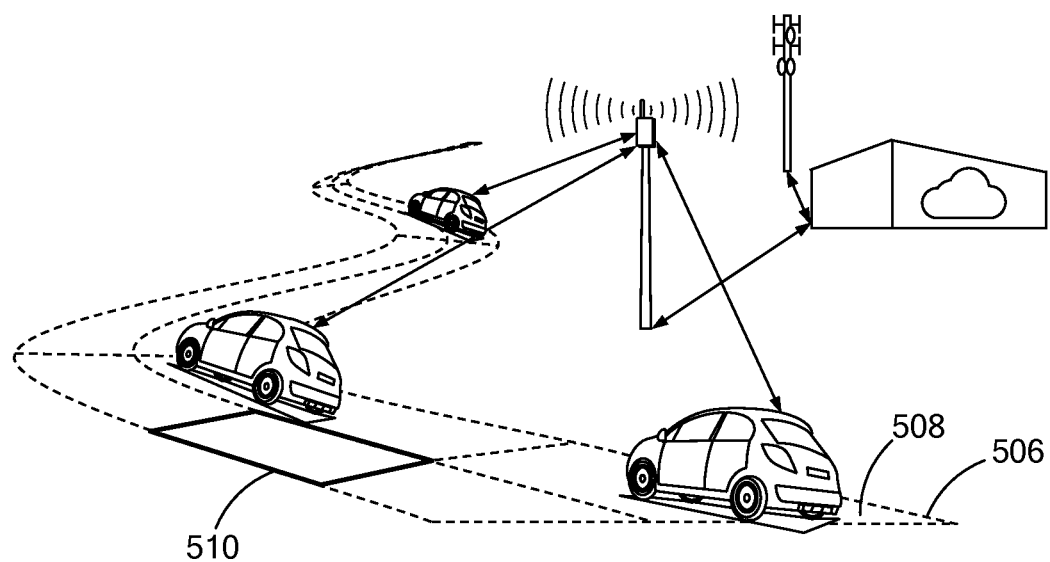

The zone analysis module 408 is configured to determine a latency map of a communication zone of the central node 106. In one form, the latency map defines a plurality of cells within the communication zone based on the latency data associated with a respective cell, geometric segmentation, or a combination thereof. More particularly, referring to FIGS. 5A and 5B, a roadside device 502, which can be configured as a central node 106, determines latency characterization information for devices within a defined geographical area (i.e., a communication zone). In one example, the latency map is provided along a selected area that includes the geographical area 504 such that a plurality of cells 505 covers the geographical area 504 (FIG. 5A). In another example, a latency map 506 is provided along a road network 508 (i.e., selected area) traversing through the geographical area 504 such that the plurality of cells 510 extend along the road network 508 (FIG. 5B).

In one form, the zone analysis module 408 is configured to segment the selected area of the communication zone into a plurality of cells using the latency estimates associated with a receptive cell. For example, latency data may be transmitted with contextual data to identify location associated with the latency data. In one form, the zone analysis module 408 plots the location of the latency data with respect to the communication zone, defines the cells along the selected area based on the latency data, and aggregate latency data for the respective cells. The latency analysis module 122 determines latency characterization information for each cell based on the aggregated latency data associated with the cell. In another form, the zone analysis module 408 is configured to segment the communication zone based on road network provided within the communication zone. That is, the road network includes one or more roads and the zone analysis module 408 segments parts of the road which includes lanes, intersection(s), ramp(s), road exit(s), and/or road entrance(s). In one form, the segmentation of the road network can be based on the latency estimates or be predefined.

Figure 6:
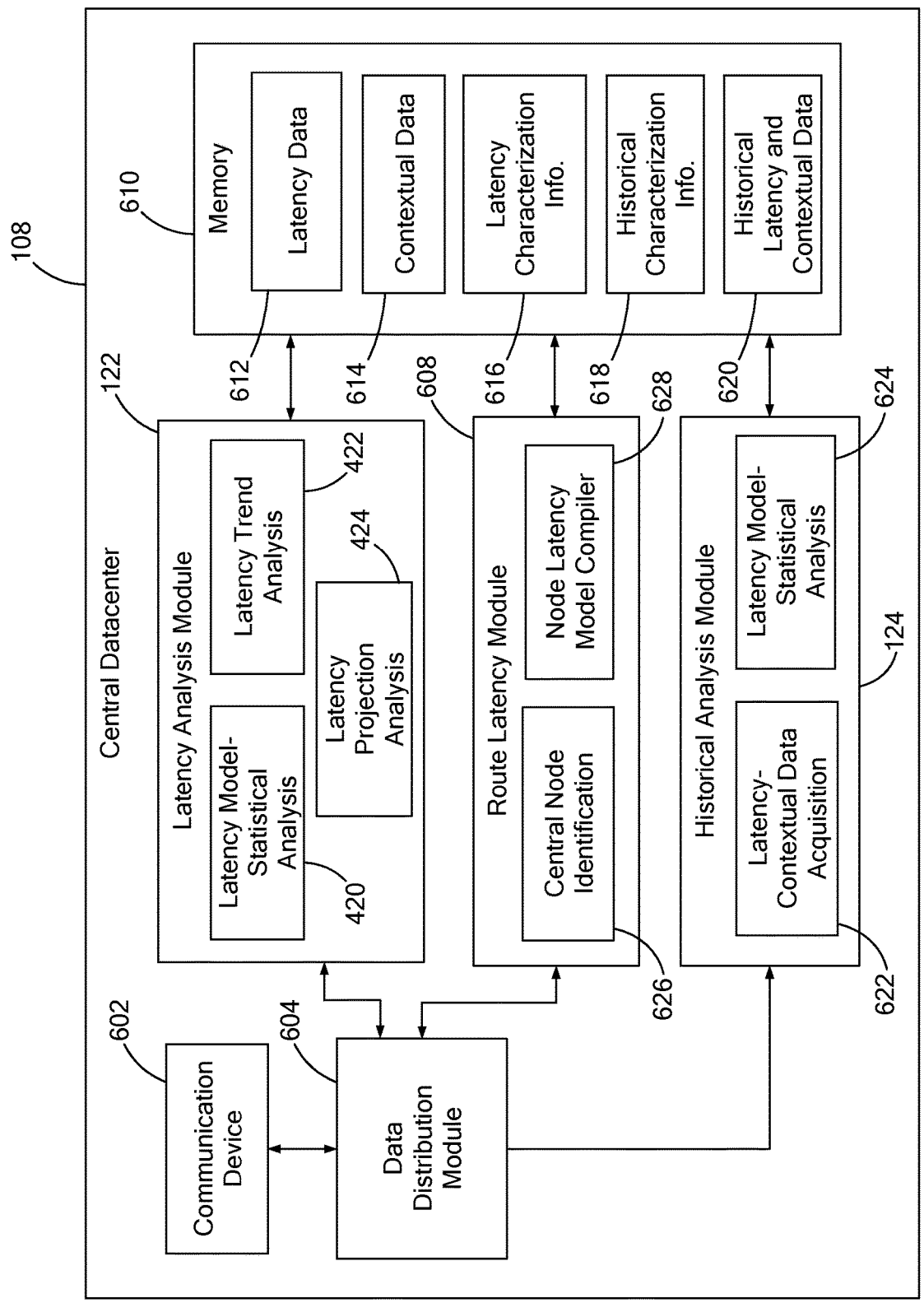
FIG. 6 is a functional block diagram of a central datacenter of the central latency system of FIG. 1.

Referring to FIG. 6, in one form, the central datacenter 108 includes a communication device 602, a data distribution module 604, the latency analysis module 122 described above, the historical analysis module 124, a route latency module 608, and memory 610 for storing various data. In one form, the central datacenter 108 includes a controller having one or more microprocessors, memory (e.g., RAM, ROM, etc.) that stores computer readable instructions (i.e., software programs) executed by the microprocessor, and other suitable components. The controller is configured to perform the operations provided herein with respect to the central datacenter 108.

In one form, the memory 610 is configured as a data repository with one or more databases and is configured to store latency data 612 of nodes 104 and 106, contextual data 614 regarding the latency data, latency characterization information 616 calculated by the central nodes 106 and/or the datacenter 108 for the central nodes 106, historical latency characterization information 618, and historical latency and contextual data 620. The communication device 602 may be configured in a similar manner as communication devices 302 and 402, and thus may include communication hardware such as transceivers, routers, and/or other components. The data distribution module 604 is configured in a similar manner as data distribution module 406 for processing latency characterization requests.

The historical analysis module 124 analyzes historical latency estimates stored in the memory 610 and provides historical latency characterization information that includes historical latency models and/or projections to, for example, the vehicles. In one form, the historical analysis module 124 performs a latency-contextual data acquisition 622 to retrieve data from the memory 610 and latency model-statistical analysis 624 to determine the historical latency characterization information based on the data retrieved from the memory 610. In one form, the latency model-statistical analysis 624 operates in a similar manner as the latency model-statistical analysis of the latency analysis module 122. While not illustrated, the historical analysis module 124 may also be configured to perform a latency trend analysis and latency projection analysis using the historical data. Examples of historical analysis module 124 are also described in the above referenced co-pending application U.S. Ser. No. 15/882,420.

The route latency module 608 is configured to provide current latency characterization information associated with one or more central nodes for a travel route planned by the vehicle. In one form, the route latency module 608 performs a central node identification 626 to identity central nodes along a travel route, and a node latency model complier 628 to acquire latency characterization information for the identified central nodes along the travel route.

As an example, a vehicle, as a leaf node, may transmit one or more travel routes to the central datacenter 108 requesting latency characterization information for central nodes 106 provided along a given travel route. Based on the travel route(s) provided, the central node identification 626 identifies central nodes along the travel route based on the known locations of the central nodes, and then the node latency model complier 628 retrieves the latency characterization information for the identified central nodes from the memory 610. This can be done for each travel route provided. The data distribution module 604 and communication device 602 transmit the information to the requesting vehicle for further evaluation.

The central datacenter 108 is configured to maintain current status of the latency conditions of the central nodes 106, and the current characterization can be shared with the leaf nodes for route/activity planning. For example, as a vehicle or mobile device moves from one central node to another central node, the data for the upcoming central nodes (e.g., predetermine number of nodes from current node) can be shared for dynamically updating the route and/or services.

With the latency analysis module and the historical analysis module, the central latency system 102 is configured to characterize latency estimates for estimates respectively for current data, future data, and historical data. The characterization information based on current and/or historical latency estimates can then be forwarded to vehicles communicably coupled to the central latency system 102.

While the central node 106 is provided as having the latency analysis module 122, in another form, the central node 106 may only compute its latency data and the data driven calculations may be performed by the central datacenter 108. Accordingly, the central node 106 may be configured to include the communication device 402 and the latency analysis module 122 for determining its latency data. In this form, the central datacenter 108 may further be configured to include the zone analysis module. In yet another form, the central node 106 may not have any computing capabilities and is configured to provide network connection to the central datacenter 108.

As provided herein, vehicles traveling within the system 100 exchange data with the central latency system 102 to assess delays in signal transmission and processing. This information may be used by a vehicle to determine whether a drive assist application, such as lane change assist or collision avoidance, among others, may be safely executed. The vehicle may be provided as a fully-autonomous vehicle in which a user may enter a destination and a vehicle control system drives the vehicle to the destination based on a defined travel route. In another form, the vehicle may be provided as a semi-autonomous vehicle having conditional automation and/or high automation.

Figure 7:
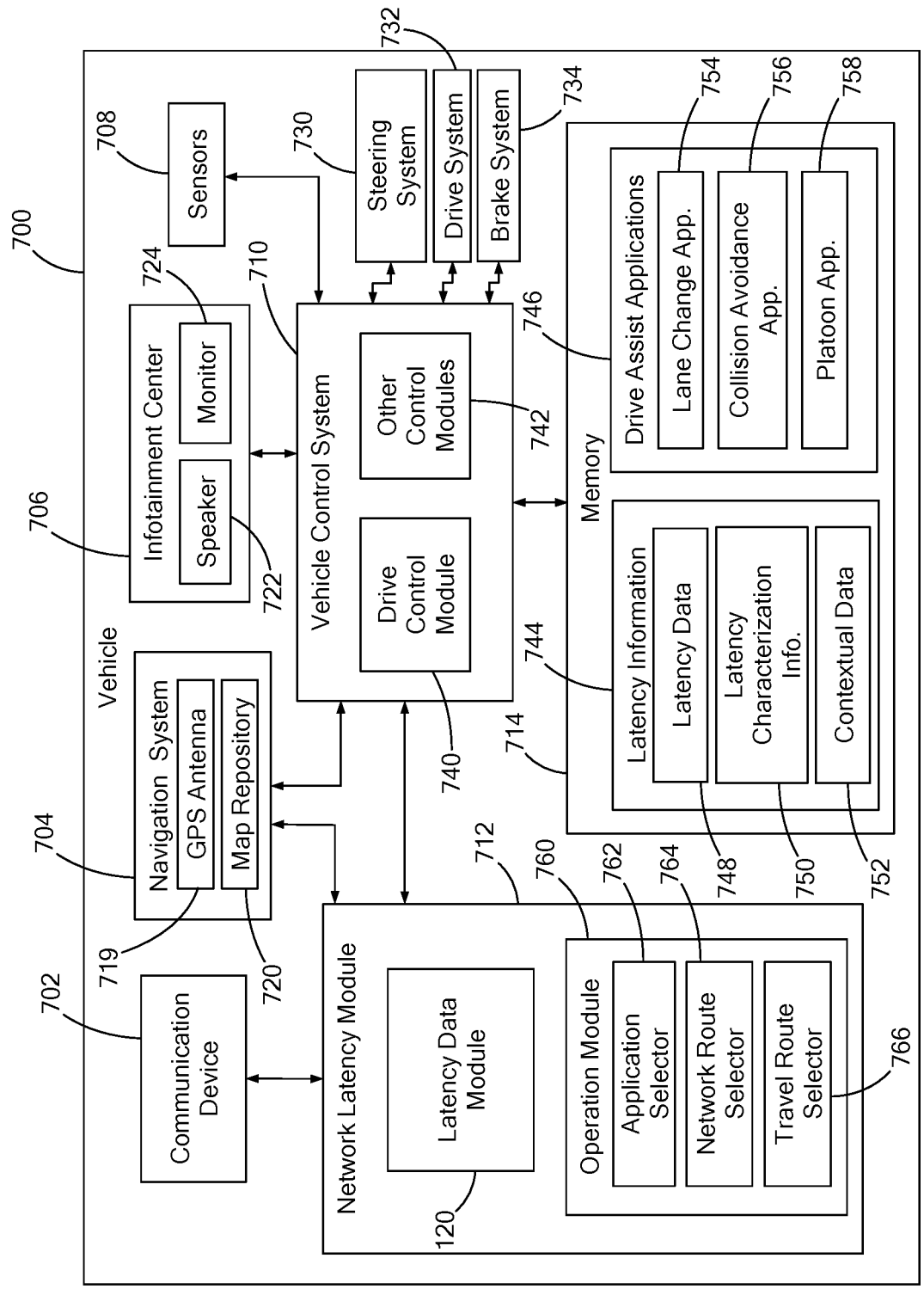
FIG. 7 is a functional block diagram of a vehicle in accordance with the teachings of the present disclosure.

FIG. 7 illustrates a vehicle 700 that can be a leaf node of the system 100 and acquires latency characterization information from the central latency system 102. In one form, the vehicle 700 includes a communication device 702, a navigation system 704, an infotainment center 706, multiple sensors 708, a vehicle control system 710, a network latency module 712, and a memory 714. In one form, the vehicle 700 includes one or more controllers that are configured to perform the process described herein. The one or more controllers may include a processor circuit, a memory for storing code executed by the processor circuit, and other suitable hardware components.

The communication device 702 is configured to exchange data with other devices in the system 100 via the communication network 105. In one form, the communication device 702 includes a transceiver (not shown) for connecting to the communication network 105 and a controller configured to process messages received from other nodes and generate messages to be transmitted. For example, in one form, the communication device 702 is configured to transmit a latency characterization request to the central latency system 102. The latency characterization request may include latency data and contextual data such as vehicle identification, vehicle location, speed, travel direction, date, time, and/or proposed travel routes.

The navigation system 704 is configured to determine the location of the vehicle 700 and determine travel route(s) to a destination specified by a user. In one form, the navigation system 704 includes a GPS antenna 719 and a map repository 720 that stores various navigational maps that illustrate roads, transit routes, points of interest, and other suitable information.

The infotainment center 706 is configured to provide information and/or entertainment to and receive commands from a vehicle passenger. The infotainment center 706 is typically provided within a passenger cabin of the vehicle 700, and may include a speaker 722, a monitor 724 (e.g., liquid crystal display), and/or other devices such as touchscreen, buttons, and/or knobs (not shown).

In one form, the sensors 708 are provided about the vehicle 700 to detect the environment about the vehicle 700 and/or monitor the operation of various sub-systems within the vehicle 700. For example, the sensors 708 may include object detectors, such as LIDAR, sonar, cameras, and system sensors, to detect steering angle sensors, brake pedal, vehicle speed, and temperature, among other operation characteristics.

In one form, the vehicle control system 710 is configured to control various vehicle subsystems such as a steering system 730, a drive system 732, and brake system 734, based on inputs from a user. The steering system 730 includes a series of components such as a steering wheel, steering angle sensors, and powered steering gears, for moving the vehicle 700 based on a rotation of the steering wheel provided by a driver. The drive system 732 is configured to generate and deliver power to the wheels of the vehicle 700 to move the vehicle 700. Based on the type of vehicle 700, the drive system 732 includes components such as, but not limited to, engine, transmission, battery system, electric motors, wheels, suspension, converter/generator, actuators, and/or sensors for detecting speed/velocity, wheel angle, and vehicle heading. The brake system 734 is operable to slow the vehicle 700 based on a control command from the vehicle control system 710 and/or an input from the driver. Based on the type of brake system (e.g., regenerative, hydraulic, etc.), the brake system 734 may include components such as, but not limited to, pedal, brakes, disc, and/or brake controllers. While specific sub-systems are illustrated, the vehicle 700 may include other sub-systems.

In one form, vehicle control system 710 includes a drive control module 740 and other modules 742 for controlling the operation of the vehicle 700. The drive control module 740 is configured to drive the vehicle 700 by controlling the drive system 732 and the brake system 734. More particularly, if the vehicle 700 is a fully autonomous vehicle, the drive control module 740 controls the subsystems to drive the vehicle 700 to a specified destination in accordance with one or more drive assist applications. In another form, the vehicle 700 may be a semi-autonomous vehicle that is manually operated by a driver but includes one or more drive assist applications for controlling the vehicle 700 during certain situations. For example, the drive control module 740 may control the vehicle subsystems based on driver inputs (e.g., steering input, braking input, and/or acceleration) and performs one or more automated drive assist applications such as lane change and collision avoidance, among others.

The other modules 742 may include, but is not limited to, object detection module for detecting objects about the vehicle; an infotainment module for operating the devices of the infotainment center 706 to provide information to passengers of the vehicle 700; and a climate control module for operating heating, ventilation, air-conditioning, system.

The memory 714 is configured to store latency information 744 and drive assist applications 746 executable by the vehicle control system 710. In one form, the latency information 744 includes latency data 748, latency characterization information 750, and/or contextual data 752 associated with the latency data. In one form, the drive assist applications 746 include lane change application (App.) 754, a collision avoidance application 756, and a platoon application 758. The lane change application 754 is configured to move the vehicle 700 from a first drive lane to a second drive lane based on the travel route of the vehicle 700. The collision avoidance application 756 is configured to inhibit a collision and/or reduce collision impact with a pedestrian, a vehicle, and/or other object. The collision avoidance application 756 may determine countermeasures to have the vehicle 700 avoid the collision or mitigate impact. The platoon application 758 is configured to assist a driver of the vehicle 700 during a platooning event in which one or more "follow" vehicles are controlled to closely follow one or more "lead" vehicles. A follow vehicle may also be a lead vehicle. While specific drive assist applications are provided, the vehicle 700 may include other drive assist applications.

The network latency module 712 is configured to assess the latency of the network 105 and based on the latency, determines certain operations of the vehicle 700. In one form, the network latency module 712 includes the latency data module 120 to determine latency estimates and an operation module 760 that includes an application selector 762, a network route selector 764, and a travel route selector 766. The latency data module 120 determines the latency estimates as described above, stores the latency estimates in the memory 714, as latency data.

The application selector 762 is configured in similar manner as application selector 320 to enable execution of drive assist applications provided within the vehicle 700 based on a confidence level, projection data, and/or other latency characterization information. The network route selector 764 is configured in a similar manner as network route selector 322 and selects a route for transmitting and receiving signals associated with a drive assist application based on the confidence level, projection data and/or other latency characterization information.

The travel route selector 766 is configured to select a travel route for the vehicle 700 based on latency characterization information and/or historical characterization information. As an example, a travel route selector 766 is provided in the above-referenced co-pending U.S. application Ser. No. 15/882,420. Generally, the navigation system 704 defines multiple travel routes to a destination, and the travel route selector 766 selects one of the travel routes for the vehicle 700 based on latency characterization information for the route. That is, the central latency system 102 provides the latency characterization information for each central node of a given route. Using this information, the travel route selector 766 selects the travel route with the best metrics and/or least overall latency and/or overall predicted latency. The travel route selector 766 may select the shortest traveling route, the traveling route with a minimal overall latency and/or minimal average signal latency, or a traveling route that is not the shortest route and does not have the minimal overall and/or average signal latency. In another example, the travel route is selected based on a sum of a predetermined weighting of metrics for each travel route. For example, the predetermined weighting may include multiplying predetermined weights by (i) the length of the travel route, and (ii) the overall and/or average signal latency. The travel route with the minimal overall latencies may enable certain drive assist applications.

Figure 8:
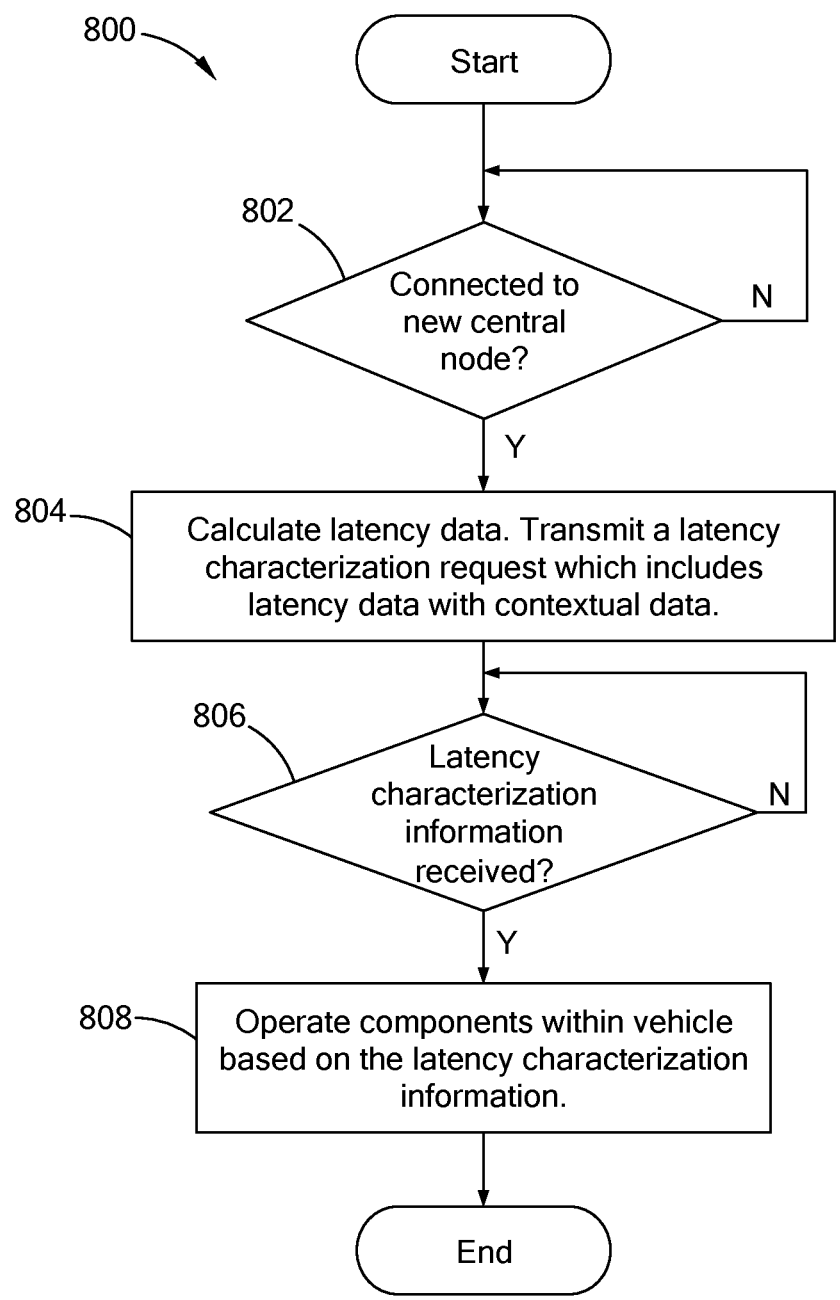
FIG. 8 is a flowchart of a latency acquisition routine in accordance with the teachings of the present disclosure.
Figure 10:
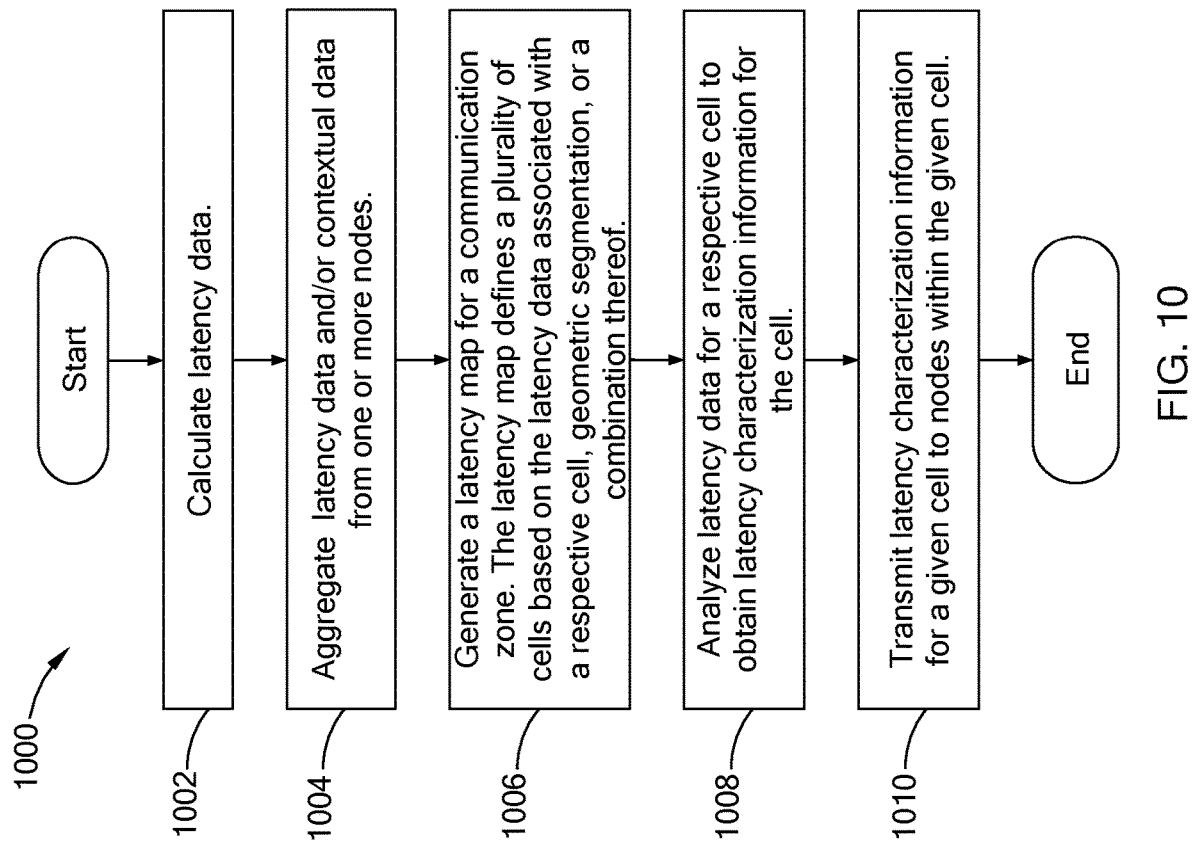
FIG. 10 is a flowchart of a latency map characterization routine in accordance with the teachings of the present disclosure.
Figure 9:
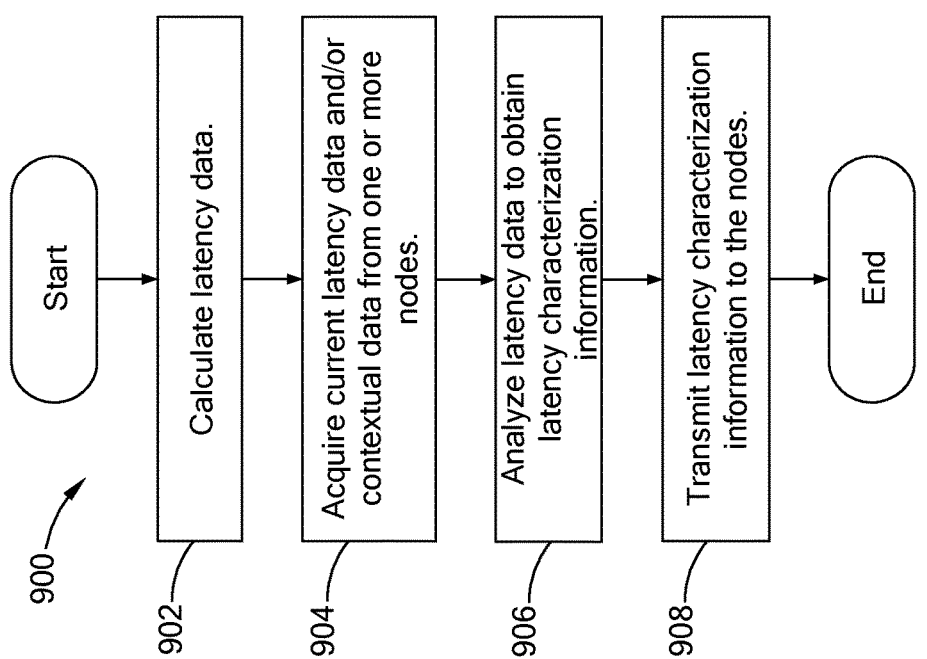
FIG. 9 is a flowchart of a latency characterization routine in accordance with the teachings of the present disclosure.

Referring to FIGS. 8-10 an example operation of the system having a leaf node and the central latency system is provided. FIG. 8 is a flowchart of an example latency acquisition routine performed by a vehicle, and more particularly, a network latency module. At 802, the module determines whether the vehicle is connected to a new central node. This can be determined based on data from the communication device of the vehicle. When a new connection is made, the module calculates latency data (e.g., latency estimate), and transmits a latency characterization request via the communication device, at 804. In one form, the latency characterization request includes the latency data and contextual data such as vehicle identification, time, date, location, and vehicle speed, among other data. The contextual data may also include one or more travel routes which can be provided by a navigation system of the vehicle. At 806, the module determines if latency characterization information is received. If so, the module operates components within the vehicle based on the latency characterization information, at 808. For example, the module may operate as an applications selector, a network route selector, and/or a travel selector as described above.

FIG. 9 illustrates a flowchart of an example latency characterization routine performed by the central latency system. This routine may be performed by the central node(s) and/or the central database, as described above. At 902, the system calculates latency data for central node(s), and at 904 acquires current latency data and/or contextual data from node(s) (e.g., leaf nodes. other central nodes). For example, if the routine is being performed at a central node, the central node calculates its own latency data. If the routine is being performed by the central database, this step may be removed. In one form, in addition to receiving latency data from leaf node, a given central node may receive latency data from other central nodes. At 906, system analyzes latency data to obtain latency characterization information. For example, the system performs a latency model-statistical analysis, a latency trend analysis, and/or a latency projection analysis, as described above. At 908, the system transmits latency characterization information to the nodes and, if applicable, to the central database.

FIG. 10 illustrates a flowchart of an example latency map characterization routine 1000 performed by the central latency system. This routine may be performed by the central node(s) and/or the central database. At 1002, the system calculates latency data for central node(s), and at 1004 acquires current latency data and/or contextual data from node(s). At 1006, system generates a latency map for a communication zone. The latency map defines a plurality of cells based on the latency data associated with a respective cell, geometric segmentation, or a combination thereof. At 1008, the system analyzes latency data for a respective cell to obtain latency characterization information for the cell. At 1010, the system transmits latency characterization information for a given cell to nodes within the given cell. For example, if that location of a node is provided in the contextual data, the system can provide the latency characterization information associated with that position.

Figure 11:
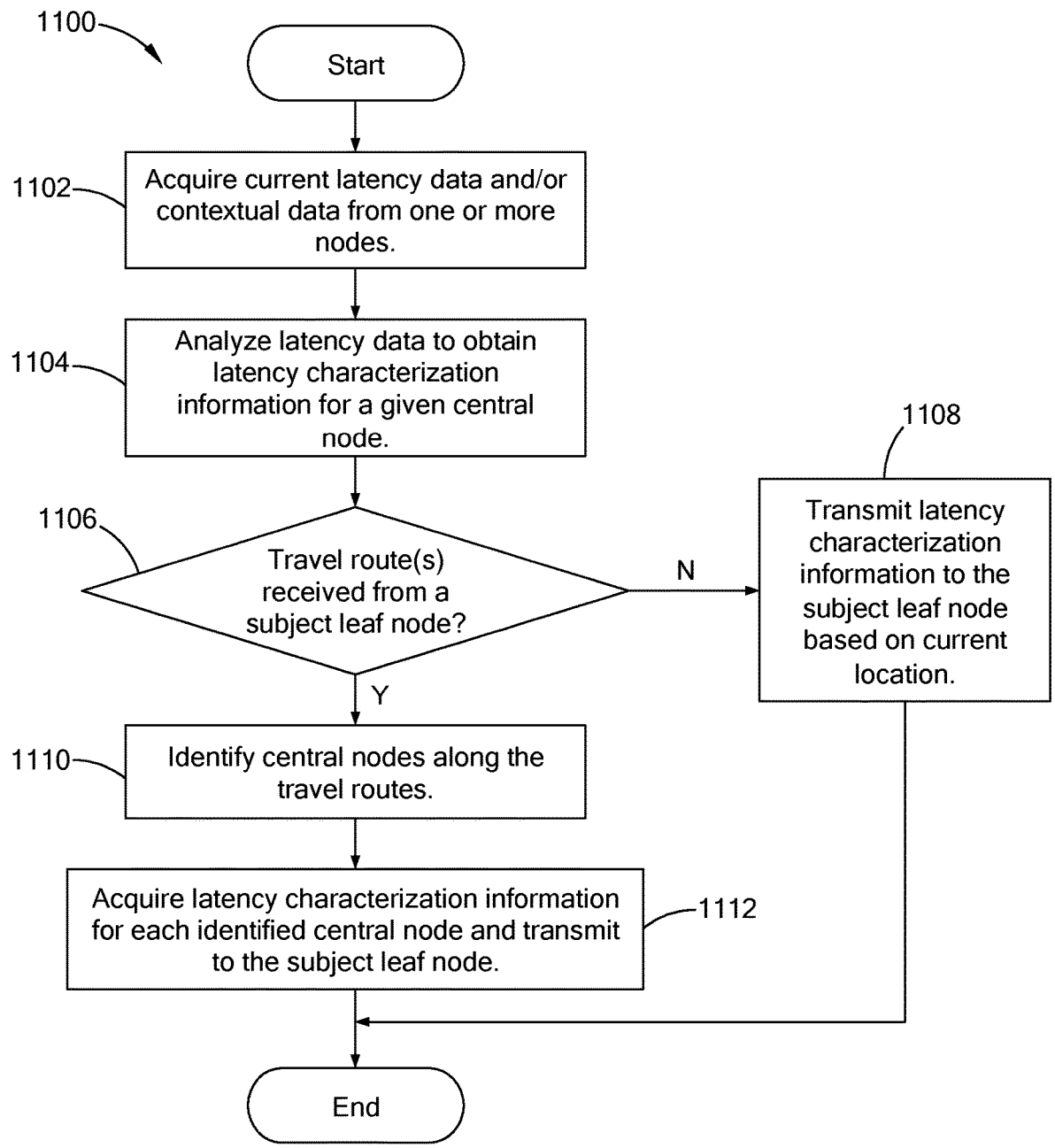
FIG. 11 is a flowchart of a travel route latency characterization routine in accordance with the teachings of the present disclosure.

FIG. 11 illustrates a flowchart of an example travel route latency characterization routine 1100 performed by the central latency system. This routine may be performed by the central database. At 1102, the system acquires current latency data and/or contextual data from node(s) including leaf and central nodes. At 1104, the system analyzes latency data associated with a given central node to obtain latency characterization information for the given central node. At 1106, the system determines whether a travel route(s) was received from a subject leaf node. If so not, the system, at 1108, transmits latency characterization information to the subject leaf node based on current location. If so, the system, at 1110, identifies central nodes along the travel route(s) and at 1112, acquires latency characterization information for each identified central node and transmits it to the subject leaf node. In one form, the evaluation at steps 1106 to 1120 can be performed for each leaf node.

With the central latency system, a vehicle or other types of leaf nodes may acquire real-time latency characterization information based on data from multiple nodes, without having to collect and process the data itself. Specifically, modeling the latency can be challenging due to the dynamic nature of latency and being able to acquire a significant statistical sample for characterizing latency. Frequency latency sampling for all nodes can cause unnecessary data traffic and utilization of network resources. The system of the present disclosure provides a collaborative centralized latency characterization system in which leaf nodes provide latency data to the central latency system and receive latency characterization information such as current and/or projected models/data. That is, detailed real-time aggregation and analysis of latency data is performed at the central latency system (e.g., central node and/or central datacenter) and not at the leaf node.

Based on the foregoing, the following provides a general overview of the present disclosure and is not a comprehensive summary. In one form, the present disclosure is directed toward a central latency system that includes a communication device and a controller. The communication device is configured to exchange data with an external device, where the data includes current latency data, current contextual data associated with the current latency data, or a combination thereof. The controller is configured to aggregate latency data in response to acquiring the current latency data, generate a latency characterization information based on the aggregated latency data, and transmit the latency characterization information to the external device via the communication device.

In one form, the central latency system further includes a central node that includes the controller and the communication device and a central datacenter that is communicably coupled to the central node and includes a second controller and a memory configured to store historical data. The historical data includes previously received latency data, previously generated latency characterization information, previously received contextual data, or a combination thereof. In one variation, the second controller is configured to determine a historical characterization information based on the historical data and transmit the historical characterization to the external device via the central node.

In another form, the central latency system further includes a central node that includes the communication device and a central datacenter that is communicably coupled to the central node and includes the controller and a memory configured to store historical data. The historical data includes previously received latency data, previously generated latency characterization information, previously received contextual data, or a combination thereof. In one variation, the controller of the central datacenter is configured to determine a historical characterization information based on the historical data and transmit the historical characterization to the external device via the central node.

In one form, the latency characterization information includes a current latency status, a current latency model, a projection model, a latency trend, a latency confidence level, a projected latency estimate, or a combination thereof.

In another form, the central latency system further includes a memory configured to store the latency characterization information, and the controller is further configured to generate the latency characterization information for a plurality of central nodes based on the latency data acquired, store the latency characterization information for the plurality of central nodes in the memory, identify at least one central node along a travel route in response to receiving the travel route, acquire the latency characterization information for the at least one central node along the travel route, and transmit the latency characterization information for each of the at least one central node along the travel route to the external device.

In yet another form, the controller is further configured to define a latency map, where the latency map defines a plurality of cells within a communication zone based on the latency data associated with a respective cell, geometric segmentation, or a combination thereof, and generate the latency characterization information for each of the cells based on the latency data for the respective cell. In one application, the latency map is defined along a road network provided within the communication zone such that the plurality of cells is defined along the road network or the latency map is defined along an area of the communication zone such that the plurality of cells covers the area of the communication zone.

In another form, the central latency system is part of a system that also includes a network latency module provided in a vehicle and communicably coupled to the central latency system. The network latency module is configured to calculate latency data and transmit the latency data to the central latency system, and the controller of the central latency system is configured to generate and transmit the latency characterization information in response to acquiring the latency data from the network latency module.

In one form, the present disclosure is directed toward a central latency system that includes a communication device configured to exchange data with an external device, where the data includes latency data, contextual data associated with the latency data, or a combination thereof, and a controller configured to define a latency map based on a communication zone in response to acquiring the latency data. The latency map defines a plurality of cells within the predefined communication zone based on the latency data associated with a respective cell, geometric segmentation, or a combination thereof. The controller is further configured to aggregate the latency data associated with each of the cells, generate a latency characterization information for each of the cells based on the aggregated latency data for the respective cell, and transmit the latency characterization information for a given cell from among the plurality of cells to the external device provided in the given cell via the communication device.

In one form, the controller is configured to define the latency map along a road network provided within the communication zone such that the plurality of cells is defined along the road network. In another form, the controller is configured to define the latency map along an area of the communication zone such that the plurality of cells covers the area of the communication zone.

In one form, the central latency system further includes a memory configured to store the latency characterization information, and the controller is further configured to identify one or more central nodes along a travel route in response to receiving the travel route, acquire the latency characterization information for the one or more central nodes along the travel route, and transmit the latency characterization information for each of the one or more central nodes.

In one form, the present disclosure is directed toward a method that includes acquiring data that includes current latency data, current contextual data associated with the latency data, or a combination thereof; aggregating latency data in response to acquiring the current latency data; generating a latency characterization information based on the aggregated latency data; and transmitting the latency characterization information to an external device.

In another form, the method further includes: defining a latency map in response to acquiring the latency data, where the latency map defines a plurality of cells within a communication zone based on the latency data associated with a respective cell, geometric segmentation, or a combination thereof, and generating the latency characterization information for each of the cells based on the latency data for the respective cell. In one application, the latency map is defined along a road network provided within the communication zone such that the plurality of cells is defined along the road network or the latency map is defined along an area of the communication zone such that the plurality of cells covers the area of the communication zone.

In one form, the method further includes: storing the latency data, the contextual data, historical data, or a combination thereof, where the historical data includes previously received latency data, previously generated latency characterization information, previously received contextual data, or a combination thereof; generating a historical characterization information based on the historical data; and transmitting the historical characterization to the external device.

In another form, the method further includes: generating the latency characterization information for a plurality of central nodes based on the latency data acquired; storing the latency characterization information for the plurality of central nodes; identifying at least one central node along a travel route in response to receiving the travel route from an external device; acquiring the latency characterization information for each of the at least one central node along the travel route; and transmitting the latency characterization information for each of the at least one central node to the external device.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A central latency system comprising:
    a vehicle controller configured to:
       generate vehicle latency data, wherein the vehicle latency data includes current latency data and current contextual data associated with the current latency data; and
       broadcast a latency characterization request based on the vehicle latency data; and
    a central controller configured to:
       aggregate latency data in response to acquiring the latency characterization request;
       generate a latency characterization information based on the aggregated latency data;
       generate historical characterization information based on historical latency data, wherein the historical latency data includes previously received latency data associated with the central controller, previously received vehicle latency data, previously generated latency characterization information, and previously received contextual datao; and
       transmit the latency characterization information and the historical characterization information to the vehicle controller.

2. The central latency system of claim 1 further comprising:
    a central node including the central controller; and
    a central datacenter communicably coupled to the central node and including a second controller and a memory configured to store the historical latency data.

3. The central latency system of claim 2, wherein the second controller is configured to determine the historical characterization information based on the historical latency data and transmit the historical characterization to the vehicle controller via the central node.

4. The central latency system of claim 1 further comprising:
  a central node including a communication device configured to exchange data with the vehicle controller and the central controller; and
  a central datacenter communicably coupled to the central node and including the central controller and a memory configured to store the historical latency data.

5. The central latency system of claim 4, wherein the central controller of the central datacenter is configured to determine the historical characterization information based on the historical latency data and transmit the historical characterization to the vehicle controller via the central node.

6. The central latency system of claim 1, wherein the latency characterization information includes a current latency status, a current latency model, a projection model, a latency trend, a latency confidence level, a projected latency estimate, or a combination thereof.

7. The central latency system of claim 1 further comprising:
  a memory configured to store the latency characterization information, wherein the central controller is further configured to:
    generate the latency characterization information for a plurality of central nodes based on the latency data acquired;
    store the latency characterization information for the plurality of central nodes in the memory;
    identify at least one central node along a travel route in response to receiving the travel route;
    acquire the latency characterization information for the at least one central node along the travel route; and
    transmit the latency characterization information for each of the at least one central node along the travel route to the vehicle controller.

8. The central latency system of claim 1, wherein the central controller is further configured to:
  define a latency map, wherein the latency map defines a plurality of cells within a communication zone based on the latency data associated with a respective cell, geometric segmentation, or a combination thereof; and
  generate the latency characterization information for each of the cells based on the vehicle latency data for the respective cell.

9. The central latency system of claim 8, wherein the latency map is defined along a road network provided within the communication zone such that the plurality of cells is defined along the road network or the latency map is defined along an area of the communication zone such that the plurality of cells covers the area of the communication zone.

10. A system comprising:
  the central latency system of claim 1; and
  a network latency system provided in a vehicle and communicably coupled to the central latency system, wherein:
  the network latency system is configured to calculate latency data and transmit the latency data to the central latency system, and
  the central controller of the central latency system is configured to generate and transmit the latency characterization information in response to acquiring the latency data from the network latency system.

11. A central latency system comprising:
  a vehicle controller configured to:
    generate vehicle latency data, wherein the vehicle latency data includes current latency data and current contextual data associated with the current latency data; and
    broadcast a latency characterization request based on the vehicle latency data; and
  a central controller configured to:
    define a latency map based on a communication zone in response to acquiring the vehicle latency data, wherein the latency map defines a plurality of cells within the defined communication zone based on the vehicle latency data associated with a respective cell, geometric segmentation, or a combination thereof;
    aggregate the vehicle latency data associated with each of the cells and generate a latency characterization information for each of the cells based on the aggregated latency data for the respective cell and in response to acquiring the latency characterization request;
    generate historical characterization information for each of the cells based on historical latency data for the respective cell, wherein the historical latency data includes previously received latency data associated with the central controller, previously received vehicle latency data, previously generated latency characterization information, and previously received contextual data; and
    transmit the latency characterization information and the historical characterization information for a given cell from among the plurality of cells to the vehicle controller provided in the given cell.

12. The central latency system of claim 11, wherein the latency characterization information includes a current latency status, a current latency model, a projection model, a latency trend, a latency confidence level, a projected latency estimate, or a combination thereof.

13. The central latency system of claim 11, wherein the central controller is configured to define the latency map along a road network provided within the communication zone such that the plurality of cells is defined along the road network.

14. The central latency system of claim 11, wherein the central controller is configured to define the latency map along an area of the communication zone such that the plurality of cells covers the area of the communication zone.

15. A method comprising:
  acquiring data that includes current latency data, current contextual data associated with the latency data, or a combination thereof;
  aggregating latency data in response to acquiring the current latency data and a latency characterization request from an external device;
  generating a latency characterization information based on the aggregated latency data;
  generating historical characterization information based on historical latency data, wherein the historical latency data includes previously received latency data associated with a central controller, previously received vehicle latency data, previously generated latency characterization information, and previously received contextual data; and
  transmitting the latency characterization information and the historical characterization information to the external device.

16. The method of claim 15 further comprising:

defining a latency map in response to acquiring the latency data, wherein the latency map defines a plurality of cells within a communication zone based on the latency data associated with a respective cell, geometric segmentation, or a combination thereof; and generating the latency characterization information for each of the cells based on the latency data for the respective cell.

17. The method of claim 16, wherein the latency map is defined along a road network provided within the communication zone such that the plurality of cells is defined along the road network or the latency map is defined along an area of the communication zone such that the plurality of cells covers the area of the communication zone.

18. The method of claim 15, wherein the latency characterization information includes a current latency status, a current latency model, a projection model, a latency trend, a latency confidence level, a projected latency estimate, or a combination thereof.

19. The method of claim 15 further comprising:

generating the latency characterization information for a plurality of central nodes based on the latency data acquired;

storing the latency characterization information for the plurality of central nodes;

identifying at least one central node along a travel route in response to receiving the travel route from an external device;

acquiring the latency characterization information for each of the at least one central node along the travel route; and transmitting the latency characterization information for each of the at least one central node to the external device.

* * * * *